(12) United States Patent
Liang

(10) Patent No.: US 9,408,483 B2
(45) Date of Patent: Aug. 9, 2016

(54) MANUFACTURING METHOD FOR NON-POWERED ENERGY LAYER

(71) Applicant: Green Energy Nano Technology Co., Ltd, Taipei (TW)

(72) Inventor: Ten-Show Liang, Taipei (TW)

(73) Assignee: GREEN ENERGY NANO TECHNOLOGY CO., LTD. (TW)

( * ) Notice: Subject to any disclaimer, the term of this patent is extended or adjusted under 35 U.S.C. 154(b) by 18 days.

(21) Appl. No.: 14/686,907

(22) Filed: Apr. 15, 2015

(65) Prior Publication Data

US 2015/0216333 A1    Aug. 6, 2015

Related U.S. Application Data

(63) Continuation-in-part of application No. 13/530,106, filed on Jun. 22, 2012, now abandoned.

(51) Int. Cl.
| | | |
|---|---|---|
| A47G 9/02 | (2006.01) | |
| D01F 1/02 | (2006.01) | |
| A47G 9/00 | (2006.01) | |
| D01F 1/10 | (2006.01) | |
| A47C 31/00 | (2006.01) | |
| A47C 7/38 | (2006.01) | |
| B32B 27/04 | (2006.01) | |
| B32B 3/26 | (2006.01) | |

(52) U.S. Cl.
CPC .............. A47G 9/0215 (2013.01); A47C 7/383 (2013.01); A47C 31/00 (2013.01); A47G 9/007 (2013.01); D01F 1/106 (2013.01); *A47G 2009/001* (2013.01); *B32B 3/26* (2013.01); *B32B 27/04* (2013.01)

(58) Field of Classification Search
CPC ........ A41B 17/00; A41D 31/00; B32B 27/04; B32B 3/26; D01F 1/10; D01F 1/106
USPC .......................................................... 264/103
See application file for complete search history.

(56) References Cited

U.S. PATENT DOCUMENTS

| | | | | |
|---|---|---|---|---|
| 4,999,243 A | * | 3/1991 | Maeda ........................... | 428/372 |
| 2006/0141180 A1 | * | 6/2006 | Park .............................. | 428/34.4 |

OTHER PUBLICATIONS

USPTO, Office Action Mailed Jul. 31, 2014 (for U.S. Appl. No. 13/550,106—parent application).
USPTO, Office Action Mailed Dec. 23, 2014 (for U.S. Appl. No. 13/550,106—parent application).

* cited by examiner

*Primary Examiner* — Robert J Grun

(57) ABSTRACT

The present invention relates to a manufacturing method for a non-powered energy layer, wherein the non-powered energy layer is adapted for being a warming layer of a bedquilt. When a user is covered with the bedquilt using the non-powered energy layer as the warming layer, the non-powered energy layer would emit a far-infrared ray, such that the far-infrared ray would excite the user's skin, so as to make the microvascular dilation and promote the blood circulation and metabolism of user body. Besides being used as the warming layer, the non-powered energy layer can also be applied as inner layers of a mattress or a U-shaped neck bolster. Moreover, through the proof of experiment results, this non-powered energy layer would not over excite human skin when it is in long-term use, and the non-powered energy layer would not bring about allergies, itchiness or swelling in human skin.

6 Claims, 17 Drawing Sheets

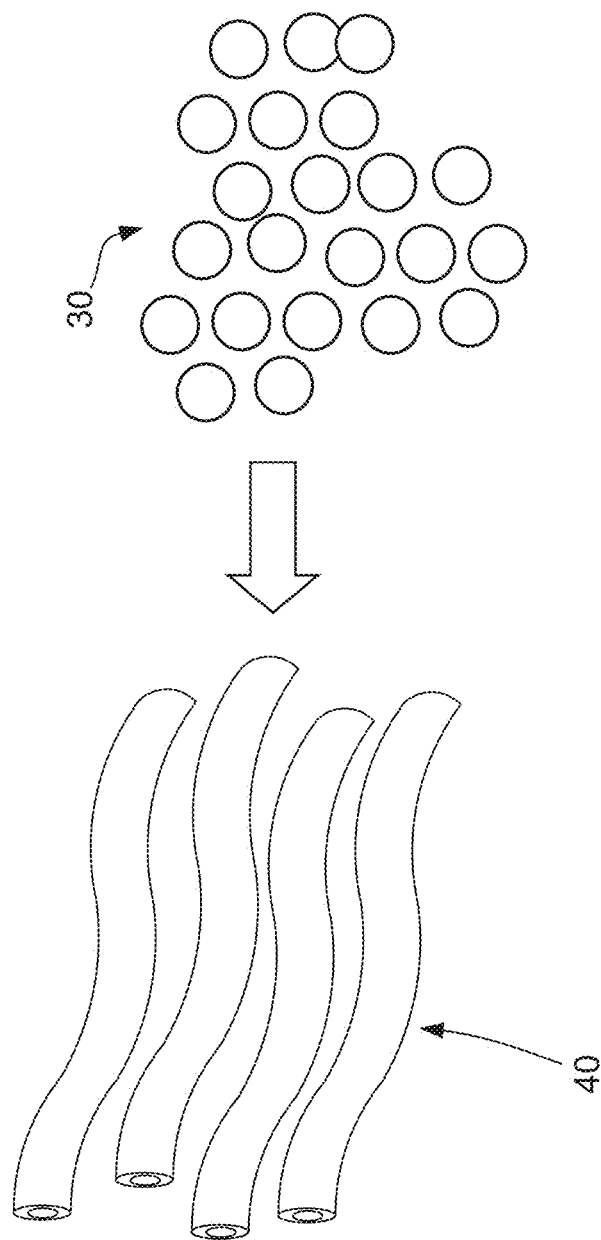

| Testing Item | Unit | Testing Method | Limit value of ICP-AES | Testing Result |
|---|---|---|---|---|
| Al | mg/kg | Dissolving the non-powered energy silk strings in acid solution, and then analyzing the content of the testing item contended by the non-powered energy silk strings through inductively coupled plasma-atomic emission spectrometer (ICP-AES) | 2 | 44 |
| Zn | | | | 6.4 |
| Ge | | | | 16 |
| Mg | | | | 7 |
| Ti | | | | 1290 |

FIG. 5A

| Testing Item | Unit | Testing Method | Limit value of ICP-AES | Testing Result |
|---|---|---|---|---|
| Al | mg/kg | Dissolving the non-powered energy silk strings in acid solution, and then analyzing the content of the testing item contended by the non-powered energy silk strings through inductively coupled plasma-atomic emission spectrometer (ICP-AES) | 2 | 27 |
| Zn | | | | 9 |
| Ge | | | | 11 |
| Mg | | | | 13 |
| Ti | | | | 1670 |

FIG. 5B

Table (1)

| Sample | Temp. | emissivity @ 4~4 μm | | | |
|---|---|---|---|---|---|
| non-powered energy mattress | 37 °C | 0.912 | | | |

FIG. 9A

Table (2)

| Sample | Temp. | emissivity @ 4~4 μm |
|---|---|---|
| non-powered energy mattress | 40 °C | 0.904 |
| | | |
| | | |

*The non-powered energy mattress has been washed 150 times

FIG. 9B body weight table of the rabbits

| I.D. | Sex | body weight (kg) | |
|---|---|---|---|
| | | Day 1 | Day 4 |
| 80014P01-04 | F | 2.9 | 3.0 |
| 80014P01-05 | F | 2.8 | 2.8 |
| 80014P01-06 | F | 3.0 | 3.0 |

FIG. 11 evaluation table for the rabbits' skin reaction

| I.D. | Observation time (hours) | Grading | | | |
|---|---|---|---|---|---|
| | | Test Part | | Control Part | |
| 80014P01-04 | 1 | 0/0 | 0/0 | 0/0 | 0/0 |
| | 24 | 0/0 | 0/0 | 0/0 | 0/0 |
| | 48 | 0/0 | 0/0 | 0/0 | 0/0 |
| | 72 | 0/0 | 0/0 | 0/0 | 0/0 |
| 80014P01-05 | 1 | 0/0 | 0/0 | 0/0 | 0/0 |
| | 24 | 0/0 | 0/0 | 0/0 | 0/0 |
| | 48 | 0/0 | 0/0 | 0/0 | 0/0 |
| | 72 | 0/0 | 0/0 | 0/0 | 0/0 |
| 80014P01-06 | 1 | 0/0 | 0/0 | 0/0 | 0/0 |
| | 24 | 0/0 | 0/0 | 0/0 | 0/0 |
| | 48 | 0/0 | 0/0 | 0/0 | 0/0 |
| | 72 | 0/0 | 0/0 | 0/0 | 0/0 |

FIG. 12 score table for primary irritation of the rabbits' skin

| I.D. | scores | | primary irritation scores |
|---|---|---|---|
| | Test Part | Control Part | |
| 80014P01-04 | 0 | 0 | 0 |
| 80014P01-05 | 0 | 0 | 0 |
| 80014P01-06 | 0 | 0 | 0 |

Primary irritation index (PII) = 0

FIG. 13

MANUFACTURING METHOD FOR NON-POWERED ENERGY LAYER

REFERENCE TO RELATED APPLICATIONS

This application is a continuation-in-part of U.S. patent application Ser. No. 13/530,106 filed on Jun. 22, 2012 and published as U.S. Patent Application Publication No. US20130341819A1 on Dec. 26, 2013.

The above referenced application, and each document cited or referenced in the above referenced application, are hereby incorporated herein by reference.

BACKGROUND OF THE INVENTION

1. Technical Field

The present invention relates to a manufacturing method for weaved layer, and more particularly, to a manufacturing method for non-powered energy layer.

2. Description of Related Art

In busy modern life, people desire to have a good sleep quality for fully relaxing their bodies and adjusting physical functions after working hard for one day; for this reason, people make more and more requirements on functionalities of quilt covers, bedquilts, blankets, and mattress.

Please refer to FIG. 1, which illustrates a stereo view of a traditional bedquilt. As shown in FIG. 1, the traditional bedquilt 1' includes an outer cotton sheet 11' and an inner warming layer 12', wherein the single outer cotton sheet 11' can used as a cool quilt for summer; On the contrary, as cold winter is coming, the bedquilt 1' can be used as a warm quilt by way of disposing the inner warming layer 12' inside the outer cotton sheet 11'. Although such traditional bedquilt 1' is widely used around the world, the heat retention of the traditional bedquilt 1' is still adequate for the old people or the people living in high latitude regions.

Thus, according to the traditional bedquilt 1' includes less heat retention and functionality, some quilt manufacturers are mixing far infrared powder into the inner warming layer 12'. The far infrared powder is able to emit a far-infrared ray, which may excite man skin, and then make the microvascular dilation and promote the blood circulation and metabolism of man body. Therefore, when a user is covered with the bedquilt having the far infrared powder, the user would get high body temperature result from the promotion of blood circulation and metabolism. Generally, far infrared materials are divided into: (1) natural ores having far-infrared radiation energy; and (2) far infrared ceramic sintered at high temperature. In which, the far-infrared radiation energy emitted by the natural ore is un-uniform, but the far-infrared radiation energy of the ceramic can be modulated by changing the proportion of raw materials thereof.

Besides the far infrared powder, quilt manufacturers also add a so-called active layer into the bedquilt, wherein the active layer is made by anion-synthetic fiber, electromagnetic chemical fiber, nano far-infrared fiber, or bamboo charcoal fiber. The main function of the active layer is to activate the body cells for enhancing the immune system, moreover, some active layers further includes the characters of less cotton batting, anti dust-mite, anti-bacterial, and good temperature resistance.

However, whatever the bedquilt having the far infrared powder or the active layer, it cannot adapted for covering the man body having sensitive skin. When the man having sensitive skin is covered with the bedquilt having the far infrared powder or the active layer, the sensitive skin would produce swelling or itching.

Accordingly, in view of the traditional bedquilt and the bedquilt having the far infrared powder or the active layer still have shortcomings and drawbacks, the inventor of the present application has made great efforts to make inventive research thereon and eventually provided a manufacturing method for non-powered energy layer.

BRIEF SUMMARY OF THE INVENTION

The primary objective of the present invention is to provide a manufacturing method for a non-powered energy layer, wherein the non-powered energy layer is adapted for being a warming layer of a bedquilt; therefore, when a user is covered with the bedquilt using the non-powered energy layer as the warming layer, the non-powered energy layer would emit a far-infrared ray to excite the user's skin, and then make the microvascular dilation and promote the blood circulation and metabolism of user body.

The another objective of the present invention is to provide a manufacturing method for a non-powered energy layer, wherein the non-powered energy layer is not only being used as the warming layer, but can also be applied as inner layers of a mattress or a U-shaped neck bolster.

Accordingly, to achieve the above objectives of the present invention, the inventor proposes a manufacturing method for non-powered energy layer, comprising the steps of:

(1) providing a powdered metal mixture mixed by a powdered titanium material, a powdered germanium material, a powdered zinc material, a powdered oxide material, and a powdered carbide material; wherein the concentrations for the powdered titanium material, the powdered germanium material, and the powdered zinc material are respectively ranged between 15 wt %-20 wt %, 0.15 wt %-0.2 wt %, and 0.05 wt %-0.1 wt %;

(2) covering and enclosing the powdered metal mixture by a polymer, wherein the polymer is mixed with a silica material of at least 50 wt %, and the chemical structure of the polymer is presented by following chemical formula 1:

[chemical formula 1]

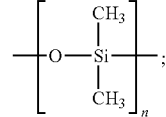

wherein n is ranged from 50 to 100;

(3) fabricating the end-product of the step (2) to a plurality of non-powered energy granules;

(4) executing a spinning process for drawing the non-powered energy granules to a plurality of non-powered energy silk strings;

(5) determining whether the non-powered energy silk strings contains a titanium content of 12.9 wt %-16.7 wt %, a germanium content of 0.11 wt %-0.16 wt %, and a zinc content of 0.06 wt %-0.09 wt %; and (6) executing a weaving process for weaving the non-powered energy silk strings to a non-powered energy layer, wherein the non-powered energy layer is able to emit a far-infrared ray, in which the wavelength of the far-infrared ray is ranged from 4 μm to 14 μm, and the emissivity of the far-infrared ray is above 90%.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein:

FIG. 3A to FIG. 3C are schematic process diagrams of the non-powered energy layer;

FIG. 5A and FIG. 5B show ICP-AES testing result tables for the non-powered energy silk strings;

FIG. 9A is a table (1) for measurement data of the emissivity of a far-infrared ray;

FIG. 9B is a table (2) for measurement data of the far-infrared ray emissivity;

FIG. 11 is a body weight table of the rabbits;

FIG. 12 an evaluation table of the rabbits' skin;

FIG. 13 is a score table for primary irritation of the rabbits' skin; and

DETAILED DESCRIPTION OF THE INVENTION

To more clearly describe a manufacturing method for non-powered energy layer according to the present invention, embodiments of the present invention will be described in detail with reference to the attached drawings hereinafter.

Figure 1:
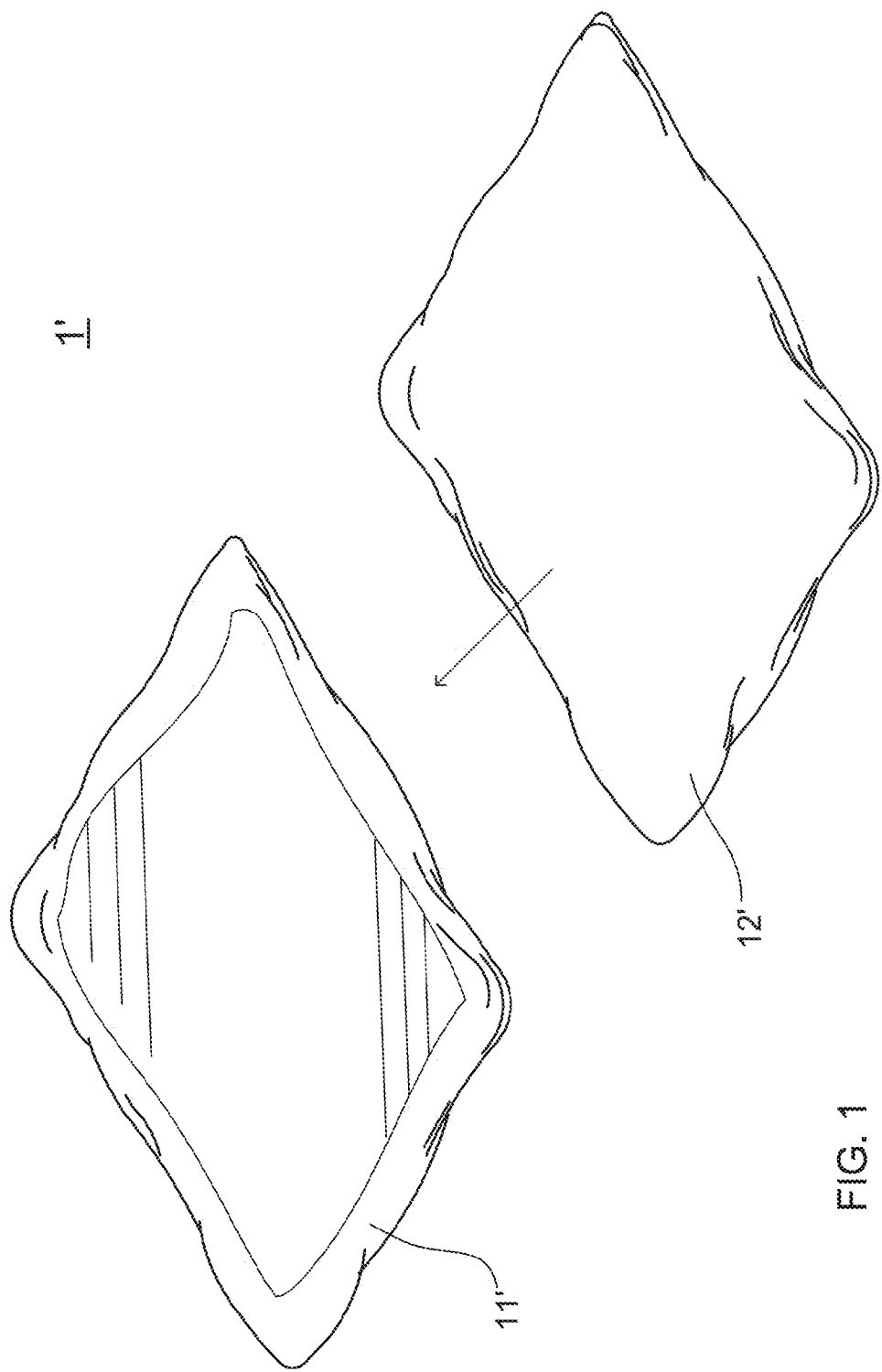
FIG. 1 is a stereo view of a traditional bedquilt.
Figure 2:
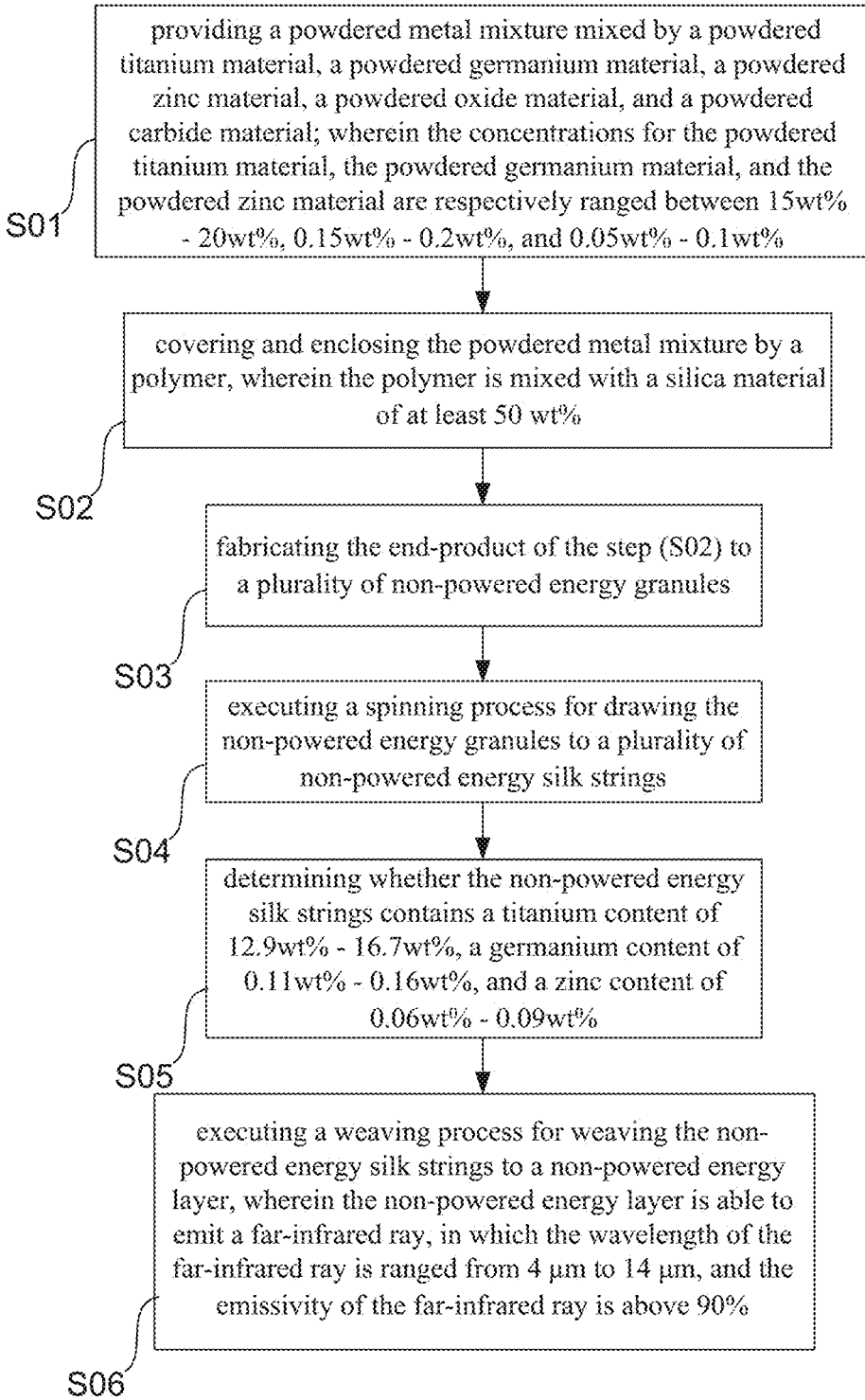
FIG. 2 is a flow chart of a manufacturing method for a non-powered energy layer according to the present invention.
Figure 3A:
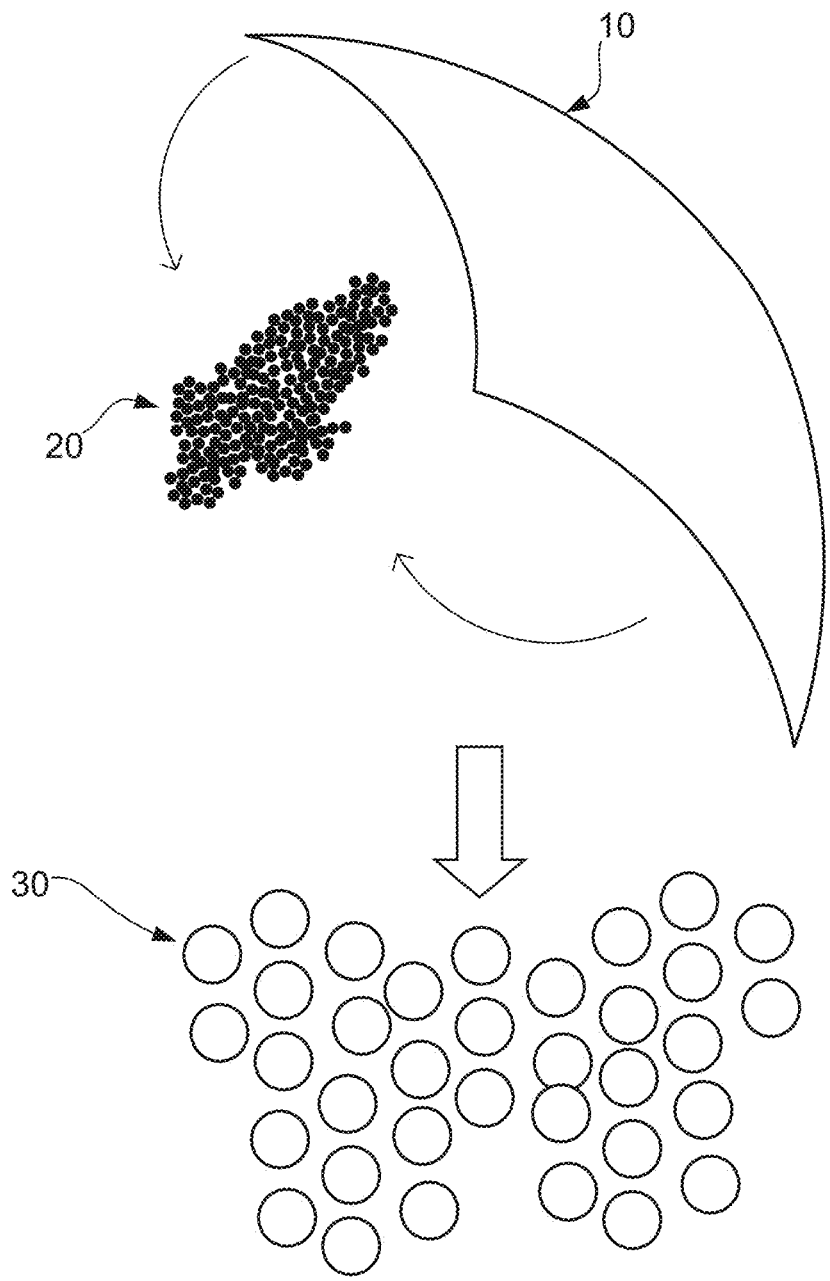
Figure 3C:
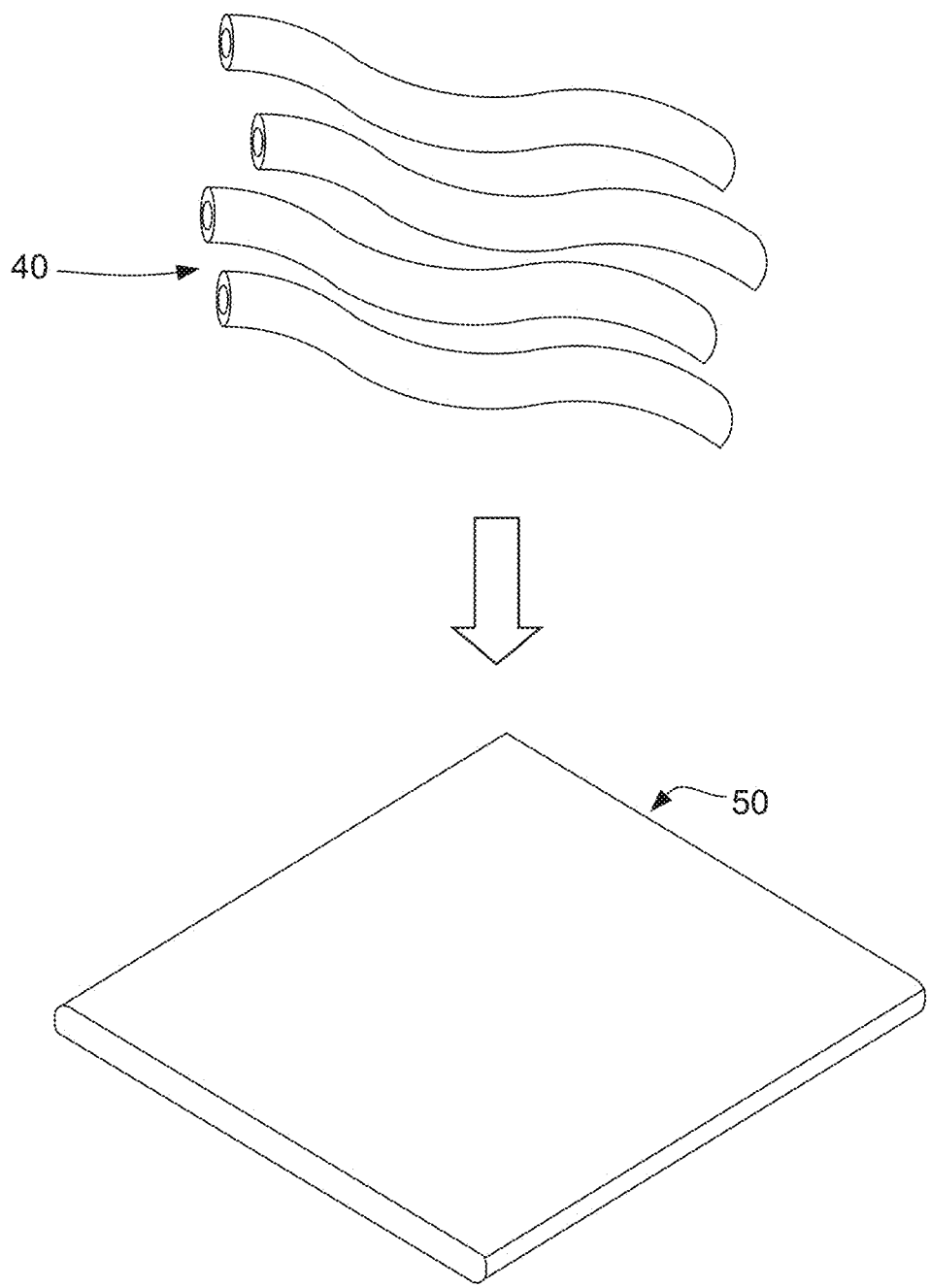

Please refer to FIG. 2, which illustrates a flow chart of the manufacturing method for non-powered energy layer according to the present invention; and please simultaneously refer to FIG. 3A to FIG. 3C, there are shown schematic process diagrams of the non-powered energy layer. The manufacturing method mainly includes four steps of:

As shown in FIG. 2, the manufacturing method is firstly proceeded to step (S01), providing a powdered metal mixture mixed by a powdered titanium material, a powdered germanium material, a powdered zinc material, a powdered oxide material, and a powdered carbide material; wherein the concentrations for the powdered titanium material, the powdered germanium material, and the powdered zinc material are respectively ranged between 15 wt %-20 wt %, 0.15 wt %-0.2 wt %, and 0.05 wt %-0.1 wt %. Next, as shown in FIG. 2 and FIG. 3A, the powdered metal mixture 20 is then covered and enclosed by a polymer 10 through step (S02); wherein the polymer 10 is mixed with a silica material of at least 50 wt %, and the chemical structure of the polymer is presented by following chemical formula 1:

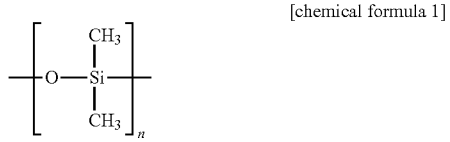

[chemical formula 1]

Figure 4:
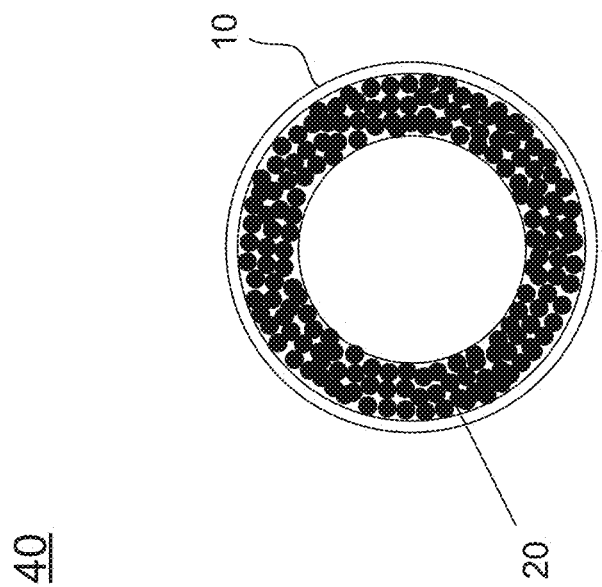
FIG. 4 is a front sectional view of a non-powered energy silk string.

In the chemical structure presented by chemical formula 1, n ranges from 50 to 100. Continuously, the method flow is proceeded to step (S03), fabricating the end-product of the step (S02) to a plurality of non-powered energy granules 30 (as shown in FIG. 3A). As shown in FIG. 2 and FIG. 3B, after step (S03) is finished, the flow is next proceeded to step (S04) for executing a spinning process so as to draw the non-powered energy granules to a plurality of non-powered energy silk strings 40. Please refer to FIG. 4, which illustrates a front sectional view of the non-powered energy silk string. As shown in FIG. 4, the non-powered energy silk string 40 is hollow with an outer layer of the polymer 10 and an inner layer of the powdered metal mixture 20.

After obtained the non-powered energy silk string 40, it needs to determine whether the non-powered energy silk strings contains a titanium content of 12.9 wt %-16.7 wt %, a germanium content of 0.11 wt %-0.16 wt %, and a zinc content of 0.06 wt %-0.09 wt %, so that step (S05) is executed subsequent to the step (SO4). Please refer to FIG. 5A and FIG. 5B, there are shown ICP-AES testing result tables for the non-powered energy silk strings. As FIG. 5A shows, sample 1 of the non-powered energy silk strings 40 is dissolved in acid solution, and then the content of the testing items contended by the non-powered energy silk strings 40 are analyzed by using the inductively coupled plasma-atomic emission spectrometer (ICP-AES). Therefore, the testing results reveal that the sample 1 of the non-powered energy silk strings 40 contains the titanium content of 12.9 wt %, the germanium content of 0.16 wt %, and the zinc content of 0.064 wt %. Herein, it needs further explain that the unit of mg/kg means ppm (part per million), and 1000 mg/kg is equal to 0.1 wt %.

As FIG. 5B shows, sample 2 of the non-powered energy silk strings 40 is also dissolved in acid solution, and then the content of the testing items contended by the non-powered energy silk strings 40 are analyzed by using the inductively coupled plasma-atomic emission spectrometer (ICP-AES). Therefore, the testing results reveal that the sample 1 of the non-powered energy silk strings 40 contains the titanium content of 16.7 wt %, the germanium content of 0.11 wt %, and the zinc content of 0.09 wt %. In the present invention, the trace amount of zinc content is helpful to modulate the wavelength of the far-infrared ray emitted by the non-powered energy silk strings 40 to be ranged between 4 μm to 14 μm. Moreover, the powdered carbide content and the powdered oxide content are used for increasing the emissivity of the far-infrared ray.

Figure 6:
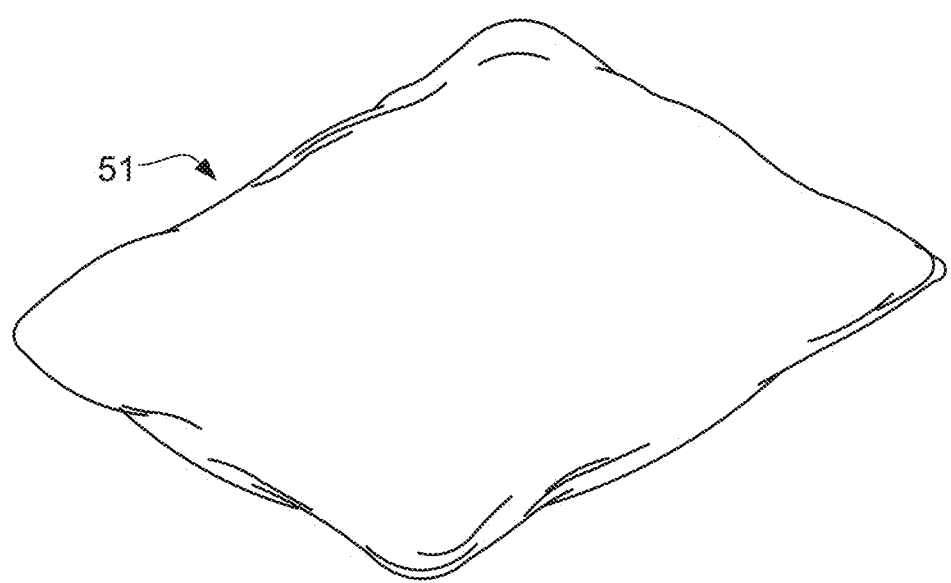
FIG. 6 is a stereo view of a bedquilt.
Figure 7:
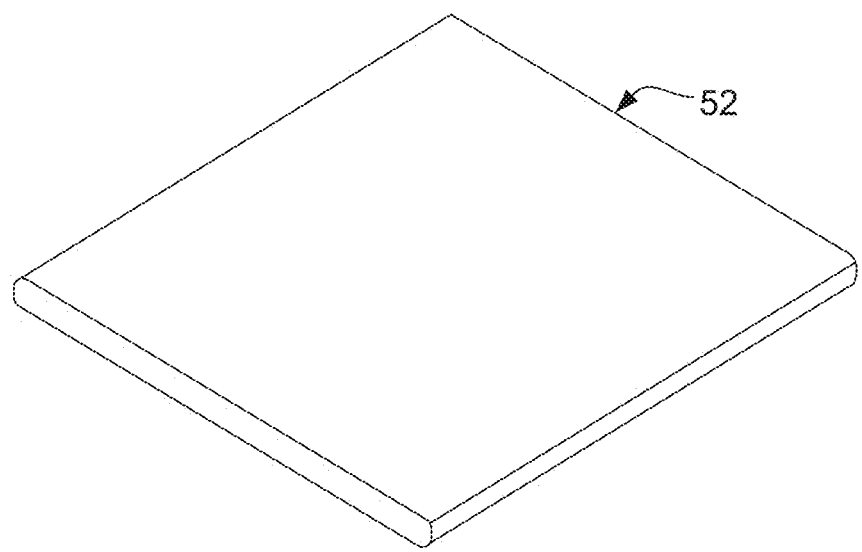
FIG. 7 is a stereo view of a mattress.
Figure 8:
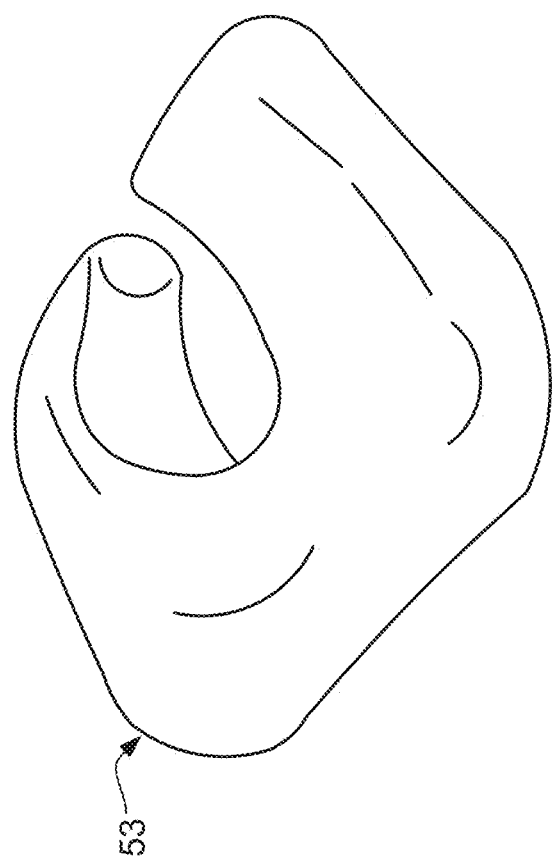
FIG. 8 is a stereo view of a U-shaped neck bolster.
Figure 10:
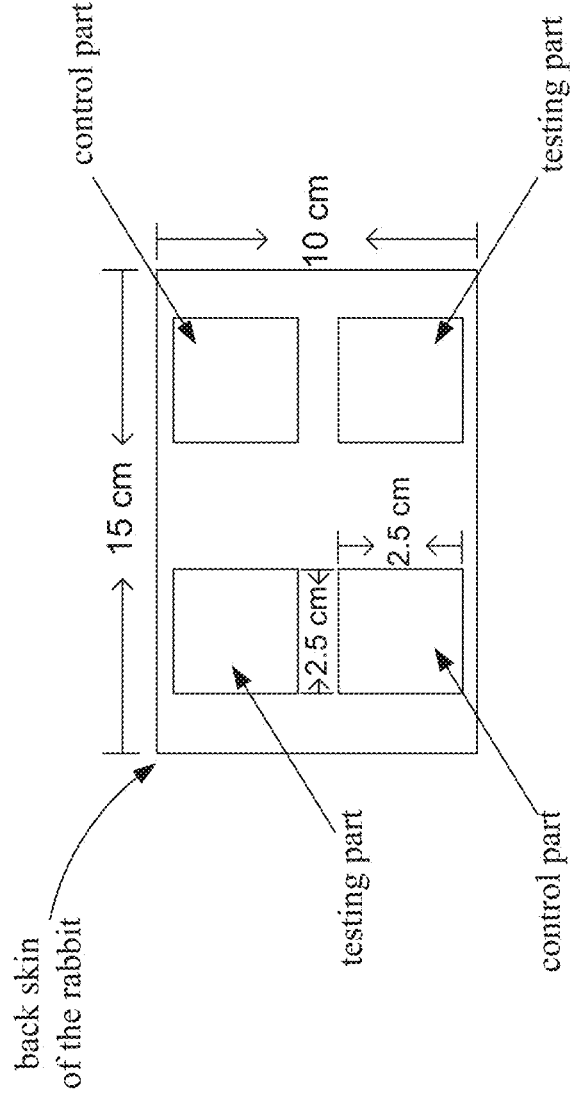
FIG. 10 is a top view of a rabbit's back skin.

As shown in FIG. 2 and FIG. 3C, the manufacturing method is eventually proceeded to step (S06), executing a weaving process for weaving the non-powered energy silk strings 40 to a non-powered energy layer 50, or to a non-powered energy silk mass or a non-powered energy yarn layer. Please refer to FIG. 6, FIG. 7 and FIG. 8, there are respectively shown stereo views of a bedquilt, a mattress and a U-shaped neck bolster. As shown in FIGS., the non-powered energy layer 50 made by using this manufacturing method can be used as an inner warming layer of the bedquilt or the inner layer of the mattress and the U-shaped neck bolster.

The non-powered energy layer 50 made by using this manufacturing method is able to emit a far-infrared ray, in which the wavelength of the far-infrared ray is ranged from 4 μm to 14 μm, and the emissivity of the far-infrared ray is above 90%. Therefore, when a user is covered with the bedquilt 51 using the non-powered energy layer 50 as the inner warming layer, far-infrared ray emitted by the non-powered energy layer 50 would excite the user's skin, so as to make the microvascular dilation and promote the blood circulation and metabolism of user body. Furthermore, in the present invention, the material of the powdered carbide can be TaC, ZrC, SiC, or a mixture made by any two aforesaid materials. And the material of the powdered oxide can be $Al_2O_3$, MgO, $NiO_2$, $SiO_2$, $ZrO_2$, or a mixture made by any two aforesaid materials.

Next, for proving the non-powered energy layer 50 made by using this manufacturing method can indeed emit the far-infrared ray with wavelength ranged between 4 μm and 14 μm, a variety of experiment data will be shown in following paragraphs. Please refer to FIG. 9A and FIG. 9B, there are respectively shown a table (1) and a table (2) for the measurement data of the far-infrared ray emissivity, wherein the measurement data of table (1) and table (2) are measured by Industrial Technology Research Institute (ITIR) of Taiwan.

As shown in FIG. 9A, the mattress, using the non-powered energy layer 50 as inner layer and called non-powered energy mattress in table (1), is able to emit the far-infrared ray with the emissivity of 91.2%. Moreover, as shown in FIG. 9B, the non-powered energy mattress still includes the far-infrared emissivity of 90.4% in spite of the non-powered energy mattress has been washed 150 times. So that, through the measurement data of table (1) and table (2), the non-powered energy layer 50 made by using this manufacturing method is proven that it can emit a far-infrared ray, and the wavelength of the emitted far-infrared ray is ranged from 4 μm to 14 μm, moreover the emissivity of the far-infrared ray is above 90%.

After that, for further proving the far-infrared ray, emitted by the non-powered energy layer 50 made by using this manufacturing method, would not bring about allergies, itchiness or swelling in human skin, a biological assessment test of CNS 14393-10:2005 is made. Three female rabbits are used as experimental animals in the biological assessment test, and the rabbits are provided by Laboratory Animal Center of National Yang-Ming University. The testing procedures of the biological assessment test are follows:

(A) fabricating test article extracts: putting a test material (i.e., the non-powered energy layer) with area of 250 cm$^2$ into an extracting solvent of 200 mL for achieving an extracting ratio of 1.25 cm$^2$/mL, and then to process the extraction by using an oscillator for 72±1 hours at 37±1° C. with constant agitation of 100 rpm.

(B) about 18~24 hours before the biological assessment test, the back hair of the rabbits are removed by electrical razor, and the shaved area is about 15 cm×10 cm. There should not have any skin scratched or injury on this area before applying with test article extracts or blank control article.

(C) as shown in FIG. 9, piece of gauze about 2.5 cm×2.5 cm is loaded with 0.5 mL test article extracts, and covered on the naked skin directly at upper left dorsal part and lower right dorsal part of the rabbits, wherein the upper left dorsal part and lower right dorsal part are testing parts in the biological assessment test.

(D) as shown in FIG. 9, piece of gauze about 2.5 cm×2.5 cm is loaded with 0.5 mL test extracts, and covered on the naked skin directly at upper left dorsal part and lower right dorsal part of the rabbits, wherein the upper left dorsal part and lower right dorsal part are testing parts in the biological assessment test.

(E) Tightening the gauzes with test article extracts and blank control article with the bandage for 4 hours and removed respectively after closed contact. Then to clean the test area and control area with distilled water.

(F) Finally, any irritation response on the local skin of the test rabbits was examined at 1, 24±1, 48±1, and 72±1 hours after removal of the patch. And the skin condition, including erythema, edema, irriration, corrosion, and other local irritation response can be graded and recoded according to the "Grading system for skin reaction" (CNS 14393-10: 2005).

Please refer to FIG. 11, FIG. 12 and FIG. 13, there are shown a body weight table of the rabbits, an evaluation table of the rabbits' skin, and a score table for primary irritation of the rabbits' skin. Moreover, please simultaneously refer to FIG. 14, which illustrates the test skin images of the rabbits. From FIG. 11, it is able to confirm that there are no obvious body weight variations on the rabbits.

Figure 14:
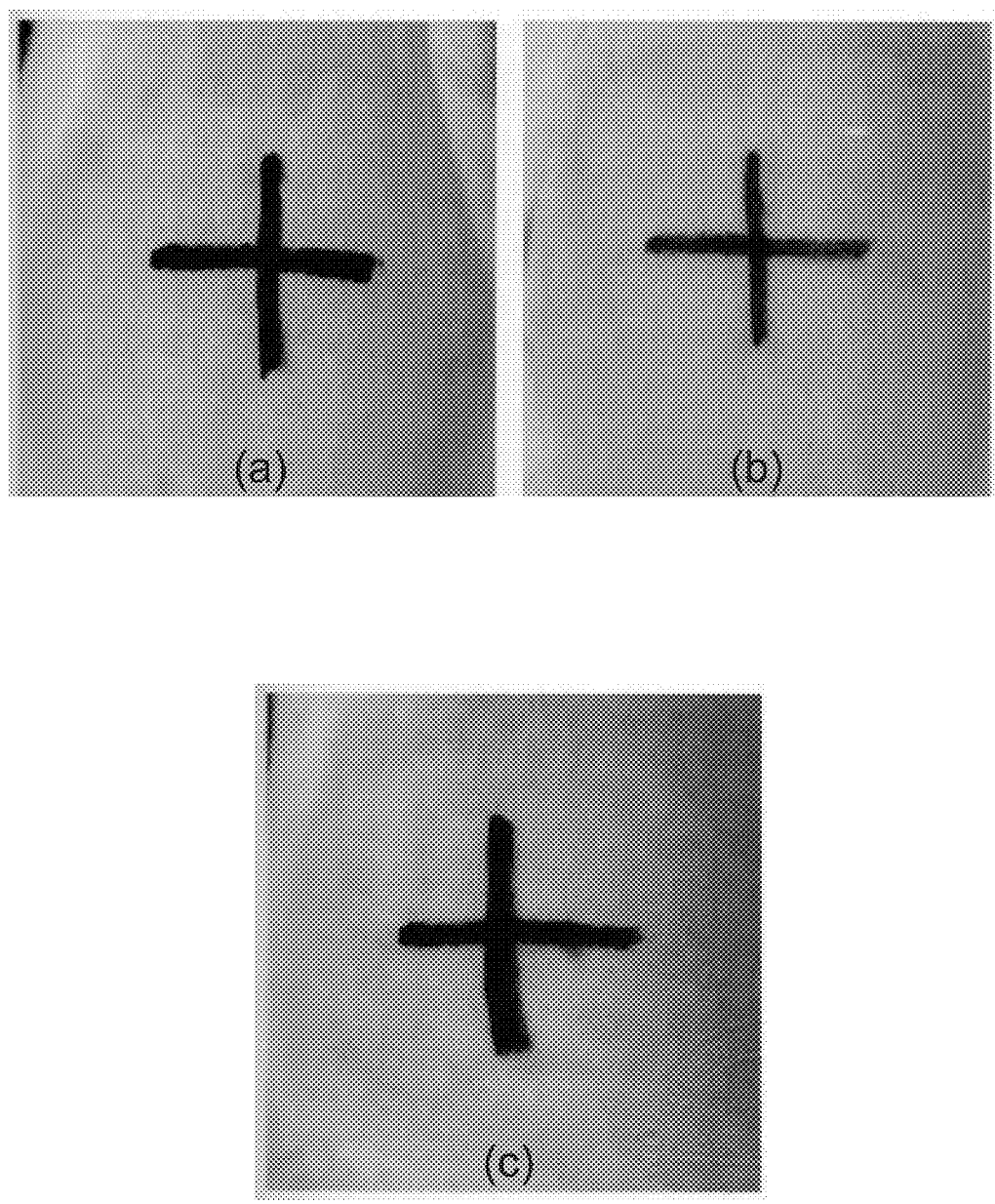
FIG. 14 is test skin images of the rabbits.

To observe image (a), image (b) and image (c) of FIG. 14, which are the test skin images of the rabbits, and there are no any irritation response on the skins after 24 hours testing. So that, in the evaluation table of the rabbits' skin (FIG. 12), all the grading for the test part and control part skin of the rabbits are zero. Moreover, in the score table for primary irritation of the rabbits' skin (FIG. 13), all the grading irritation scores and the primary irritation scores for the test part and control part skin of the rabbits are zero. So that, after completing the biological assessment test, the experiment data and results have been proved that the far-infrared ray, emitted by the non-powered energy layer made by using this manufacturing method and having the wavelength ranged between 4 μm and 14 μm, would not bring about allergies, itchiness or swelling in human skin.

Therefore, the above descriptions have been clearly and completely introduced the manufacturing method for non-powered energy layer of the present invention; in summary, the present invention has the following advantages:

1. The manufacturing method of the present invention is applied to making a non-powered energy layer, which is capable of emitting a far-infrared ray and for being a warming layer of a bedquilt. Thus, when a user is covered with the bedquilt using the non-powered energy layer as the warming layer, the far-infrared ray emitted by the non-powered energy layer would excite the user's skin, and then make the microvascular dilation and promote the blood circulation and metabolism of user body.

2. Inheriting to above point 1, besides being used as the warming layer, the non-powered energy layer can also be applied as inner layers of a mattress or a U-shaped neck bolster.

3. Inheriting to above point 1, the far-infrared ray emitted by the non-powered energy layer includes the wavelength ranged between 4 μm and 14 μm, moreover the emissivity of the far-infrared ray is above 90%.

4. Inheriting to above point 1, after completing the biological assessment test, the experiment data and results have been proved that the far-infrared ray, emitted by the non-powered energy layer made by using this manufacturing method, would not bring about allergies, itchiness or swelling in human skin.

The above description is made on embodiments of the present invention. However, the embodiments are not intended to limit scope of the present invention, and all equivalent implementations or alterations within the spirit of the present invention still fall within the scope of the present invention.

I claim:

1. A manufacturing method for non-powered energy layer, comprising the steps of:
   (1) mixing a titanium powder, a germanium powder, a zinc powder, an oxide powder, and a carbide powder to a mixture powder; wherein the concentrations for the titanium powder, the germanium powder, and the zinc powder are particularly ranged between 15wt %-20wt %, 0.15wt %-0.2wt %, and 0.05wt % -0.1wt %, respectively;
   (2) covering and enclosing the mixture powder by a polymer, wherein the polymer is mixed with a silica material of at least 50 wt %, and the chemical structure of the polymer is presented by following chemical formula 1:

[chemical formula 1]

wherein n in aforesaid chemical formula 1 is ranged from 50 to 100;
(3) fabricating the end-product of the step (2) to a plurality of non-powered energy granules;
(4) executing a spinning process for drawing the non-powered energy granules to a plurality of non-powered energy silk strings;
(5) determining whether a titanium content, a germanium content of and a zinc content contained by the non-powered energy silk strings are respectively in the scope of 12.9wt%-16.7wt%, 0.11wt%-0.16wt%, and 0.06wt%-0.09wt %, if yes proceeding to step (6); if no, proceeding to the step (1); and
(6) executing a weaving process for weaving the non-powered energy silk strings to a non-powered energy layer, wherein the non-powered energy layer is able to emit a far-infrared ray with the emissivity above 90%, and the wavelength of the far-infrared ray being ranged from 4 μm to 14 μm.

2. The manufacturing method for non-powered energy layer as described in claim 1, wherein the carbide powder and the oxide powder are used for increasing the emissivity of the far-infrared ray, and the trace amount of the zinc content being helpful to modulate the wavelength of the far-infrared ray emitted by the non-powered energy silk strings to be ranged between 4 μm to 14 μm.

3. The manufacturing method for non-powered energy layer as described in claim 1, wherein the material of the oxide powder is selected from the group consisting of: $Al_2O_3$, MgO, $NiO_2$, $SiO_2$, $ZrO_2$, and a mixture made by any two or more aforesaid materials.

4. The manufacturing method for non-powered energy layer as described in claim 1, wherein the material of the carbide powder is selected from the group consisting of: TaC, ZrC, SiC, and a mixture made by any two or more aforesaid materials.

5. The manufacturing method for non-powered energy layer as described in claim 1, wherein the non-powered energy silk string is hollow.

6. The manufacturing method for non-powered energy layer as described in claim 1, wherein the weaving process can also weave the non-powered energy silk strings to a non-powered energy silk mass or a non-powered energy yarn layer.

* * * * *